United States Patent [19]

Weber

[11] Patent Number: 5,192,349
[45] Date of Patent: Mar. 9, 1993

[54] FILTER ELEMENT FOR SEPARATING DUSTS FROM GASES

[75] Inventor: Ekkehard Weber, Essen, Fed. Rep. of Germany

[73] Assignee: Metallgesellschaft Aktiengesellschaft, Frankfurt am Main, Fed. Rep. of Germany

[21] Appl. No.: 519,887

[22] Filed: May 7, 1990

[30] Foreign Application Priority Data

May 10, 1989 [DE] Fed. Rep. of Germany ....... 3915187

[51] Int. Cl.$^5$ .............................................. B01D 46/00
[52] U.S. Cl. .......................................... 55/522; 55/525; 55/529
[58] Field of Search ........................ 55/522, 525, 529

[56] References Cited

U.S. PATENT DOCUMENTS

| | | | |
|---|---|---|---|
| 2,267,752 | 12/1941 | Ruska et al. | 219/68 |
| 3,352,769 | 11/1967 | Ruben | 428/606 |
| 3,359,192 | 12/1967 | Heinrich et al. | 204/129.4 |
| 3,482,703 | 12/1969 | Roberts et al. | 210/489 |
| 3,677,844 | 7/1972 | Fleischer et al. | 156/644 |
| 3,780,872 | 12/1973 | Pall | 55/525 |
| 3,811,999 | 5/1974 | Fleischer et al. | 428/131 |
| 4,062,771 | 12/1977 | Saupe | 210/496 |
| 4,227,904 | 10/1980 | Kasmark, Jr. et al. | 55/316 |
| 4,288,330 | 9/1981 | Strub | 210/777 |
| 4,310,602 | 1/1982 | Martin | 428/596 |
| 4,699,637 | 10/1987 | Iniotakis et al. | 55/525 |
| 4,781,831 | 11/1988 | Goldsmith | 210/486 |
| 4,872,888 | 10/1989 | Ehrfeld et al. | 55/522 |
| 4,903,617 | 2/1990 | Weber et al. | 55/523 |

FOREIGN PATENT DOCUMENTS 3134148 3/1983 Fed. Rep. of Germany.

*Primary Examiner*—Jay H. Woo
*Assistant Examiner*—Scott Bushey
*Attorney, Agent, or Firm*—Felfe & Lynch

[57] ABSTRACT

A filter element is disclosed which serves to separate dusts from gases or air and consists of metals, alloys or plastics. The element is thin-walled and sheetlike, has a wall thickness of 0.05 to 2 mm and has a large number of regularly arranged holes, which have any of various shapes and sizes and have a non-circular cross-section and a hydraulic diameter of 0.01 to 1 mm. In that filter element the area which is occupied by the holes is 3 to 25% of the front surface area of the filter element.

5 Claims, No Drawings

FILTER ELEMENT FOR SEPARATING DUSTS FROM GASES

BACKGROUND OF THE INVENTION

The present invention is in a filter element for separating dusts from gases, particularly from air, which element consists of metals, alloys or plastics and is thin-walled and sheetlike, has a wall thickness of 0.05 to 2 mm and has a large number of regularly arranged holes, which have any of various shapes and sizes with a non-circular cross-section. The openings have a hydraulic diameter of 0.01 to 1 mm.

In German Patent Application P 38 00 457.7 such a filter element has already been proposed in which the area that is occupied by the holes in 30 to 90% of the front surface area of the filter element. The use of that filter element results in a very small pressure drop but does not provide an adequate dust removal performance. It has also been found that the mechanical stability of such an element is not adequate for long-term operation. This has undesirable consequences if the area which is occupied by the holes amounts to 50 to 90% of the front surface area of the filter element.

It is an object of the invention to provide a filter element proposed in German Patent Application P 38 00 457.7 which has a high mechanical stability and can be operated for the longest possible time with a high dedusting rate and a minimum pressure drop.

THE INVENTION

The above stated object and others underlying the invention are accomplished in that the area which is occupied by the holes is 3 to 25% of the front surface area of the filter element. It has surprisingly been found that such a filter element will permit low pressure drops to be achieved in comparison with known filter media if the number of holes is so decreased that the area occupied by the holes is only 3 to 25% of the front surface area of the filter element. There will be neither a breakthrough of dust nor a clogging during the filtering operation. It has been found that it is particularly desirable that even gases having a fluctuating dust content can reliably be dedusted by the filter element in accordance with the invention.

The filter element of the invention may be used in the form of a planar surface, a flexible tube or a bag. The filter elements can be cleaned in any known manner such as by rapping and/or by a continuous or pulsed gas which is countercurrently passed through the filter element. By means of the filter element, even fine dusts are removed from the raw gas to such a degree that the pure gas has a dust content $<10$ mg/sm$^3$ (sm$^3$ = standard cubic meter).

It has been found in long-term operation that a filter element in accordance with the invention is stable in shape during an operation for 800 hours and after that time will exhibit no mechanical damage (i.e., relatively long cracks, breakouts between a plurality of holes).

The subject matter of the invention will now be explained in more detail with reference to an illustrative embodiment.

Two filter elements having identical slot holes were tested in a test stand. Only the spacing and hence the free area of the holes was different. As a result, the free area occupied by the holes in the element 1 amounted to 61% whereas the element 2 had eight times the slot spacing so that the free area occupied by the holes amounted to 18%. Owing to the decrease of the free surface area it was possible to reduce the maximum pure gas dust content from 350 mg/cm$^3$ achieved with the element 1 to 80 mg/cm$^3$ with the element 2. At the same time, in case of the same dust loading the pressure drop surprisingly was reduced only by about 15%.

The hydraulic diameter is defined as the quotient of four times the cross-sectional area of an aperture which constitutes a flow passage and the peripheral length of said aperture, as expressed by the equation $$d_h = \frac{4 \cdot F}{U}$$

where
$d_h$ = the hydraulic diameter,
F = the cross-sectional area of the aperture, and
U = the peripheral length of the aperture.

It will be understood that the specification and examples are illustrative but not limitative of the present invention and that other embodiments within the spirit and scope of the invention will suggest themselves to those skilled in the art.

I claim:

1. A filter element for separating dust from a gas which element comprises a thin walled structure having a wall thickness of 0.05 to 2 mm and a front surface having a plurality of substantially regularly arranged holes of a non-circular cross-section with a hydraulic diameter of 0.01 to 1 mm wherein the area of the holes is 3 to 25% of the front surface of the filter element, said element being of a metal, alloy or plastic.

2. The element of claim 1 wherein the holes are in the form of a slot.

3. The element of claim 1 wherein said element is a plastic surface.

4. The element of claim 1 wherein said element is a filter bag.

5. The element of claim 1 wherein said element is a flexible tube.

UNITED STATES PATENT AND TRADEMARK OFFICE
CERTIFICATE OF CORRECTION

PATENT NO. : 5,192,349
DATED : March 9, 1993
INVENTOR(S) : Ekkehard Weber

It is certified that error appears in the above-identified patent and that said Letters Patent is hereby corrected as shown below:

Column 2, line 17, "350 mg/cm$^3$" should read --350 mg/sm$^3$--.

Column 2, line 18, "80 mg/cm$^3$" should read --80 mg/sm$^3$--.

Signed and Sealed this

Eleventh Day of October, 1994

Attest:

BRUCE LEHMAN

Attesting Officer

Commissioner of Patents and Trademarks